No. 746,442. PATENTED DEC. 8, 1903.
A. J. BATES.
MACHINE FOR MAKING WIRE HOOPS.
APPLICATION FILED OCT. 5, 1903.
NO MODEL. 6 SHEETS—SHEET 4.
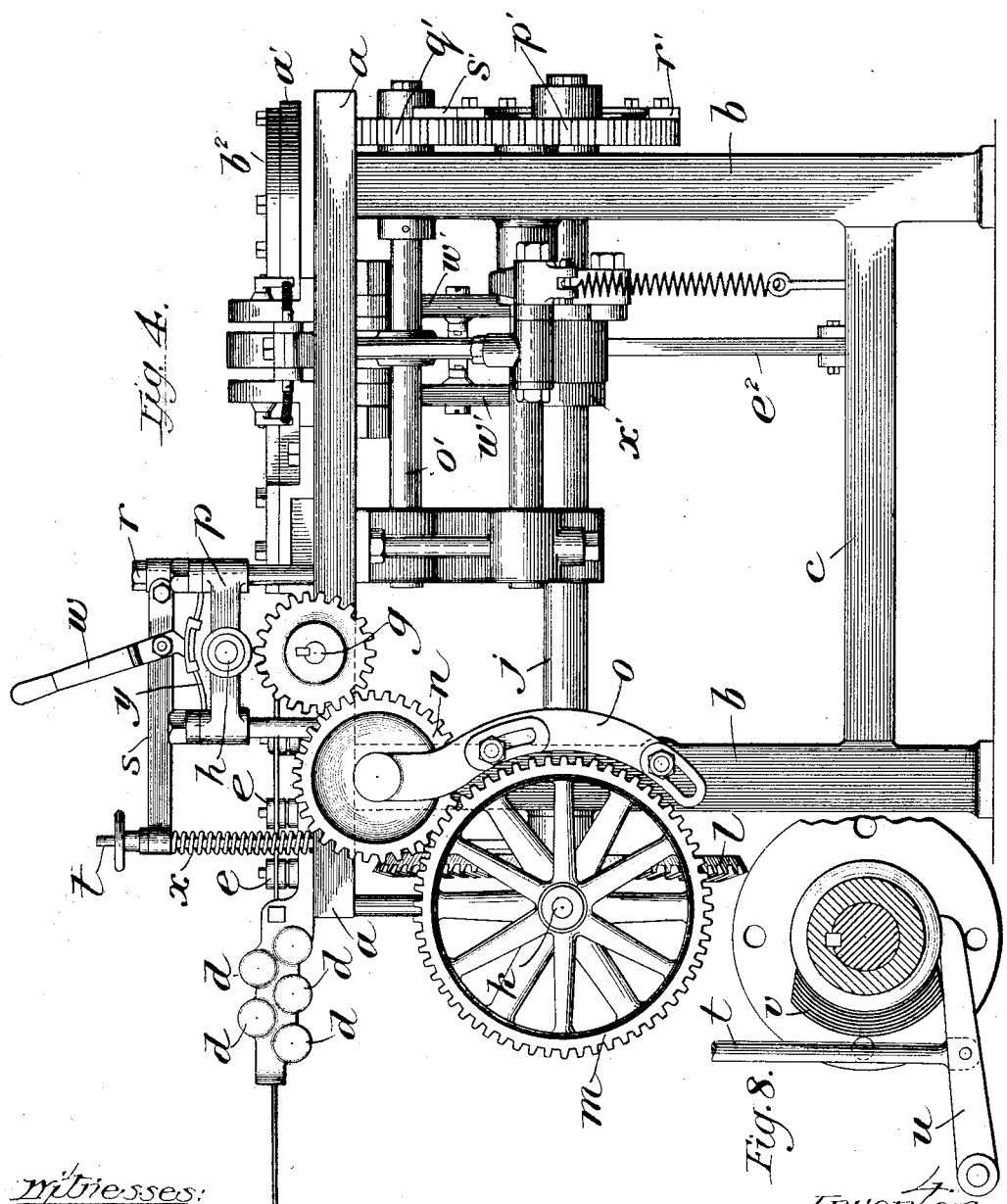
Witnesses:
Harold G. Barutt
Lute S. Alter
Inventor
Albert J. Bates

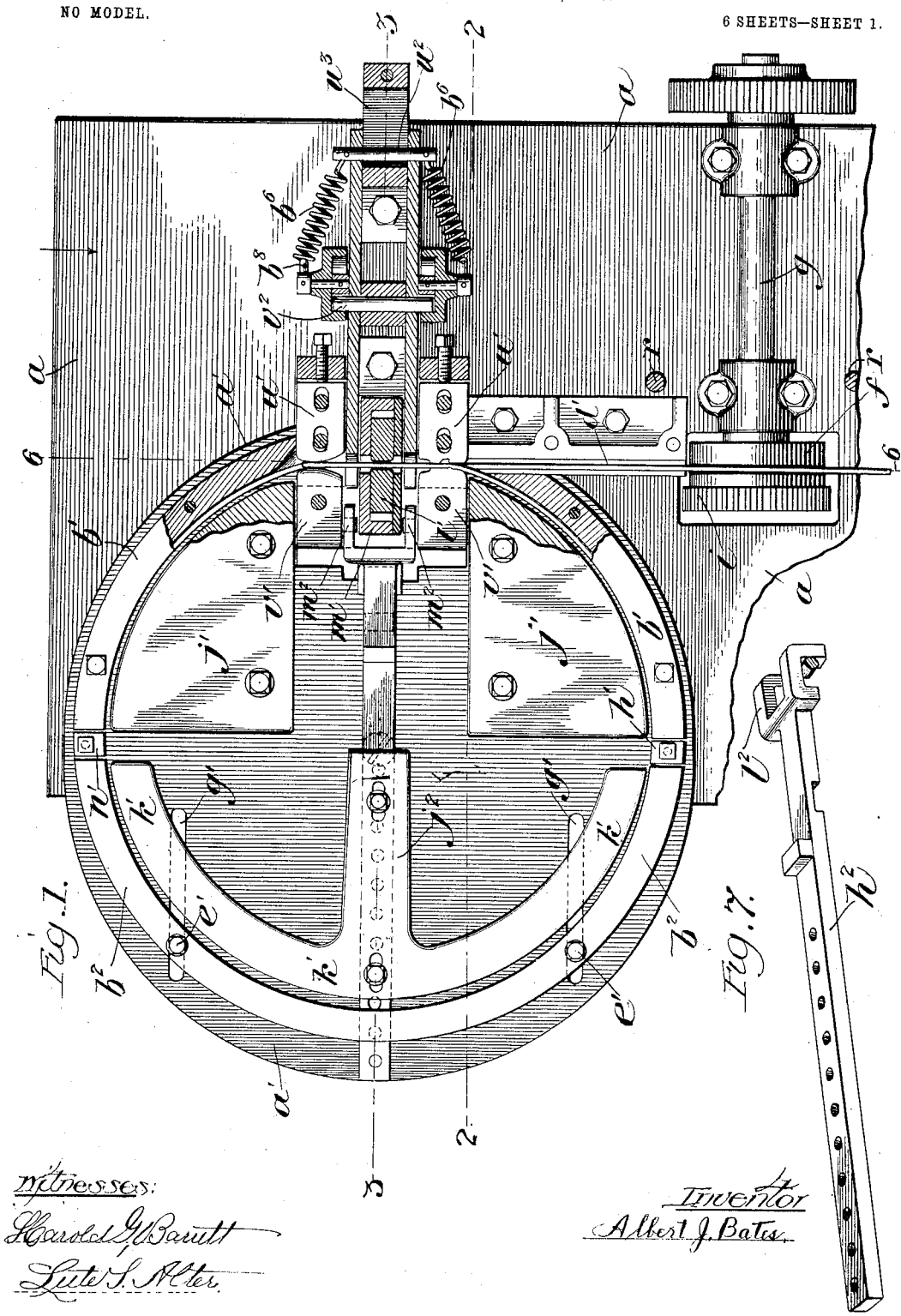

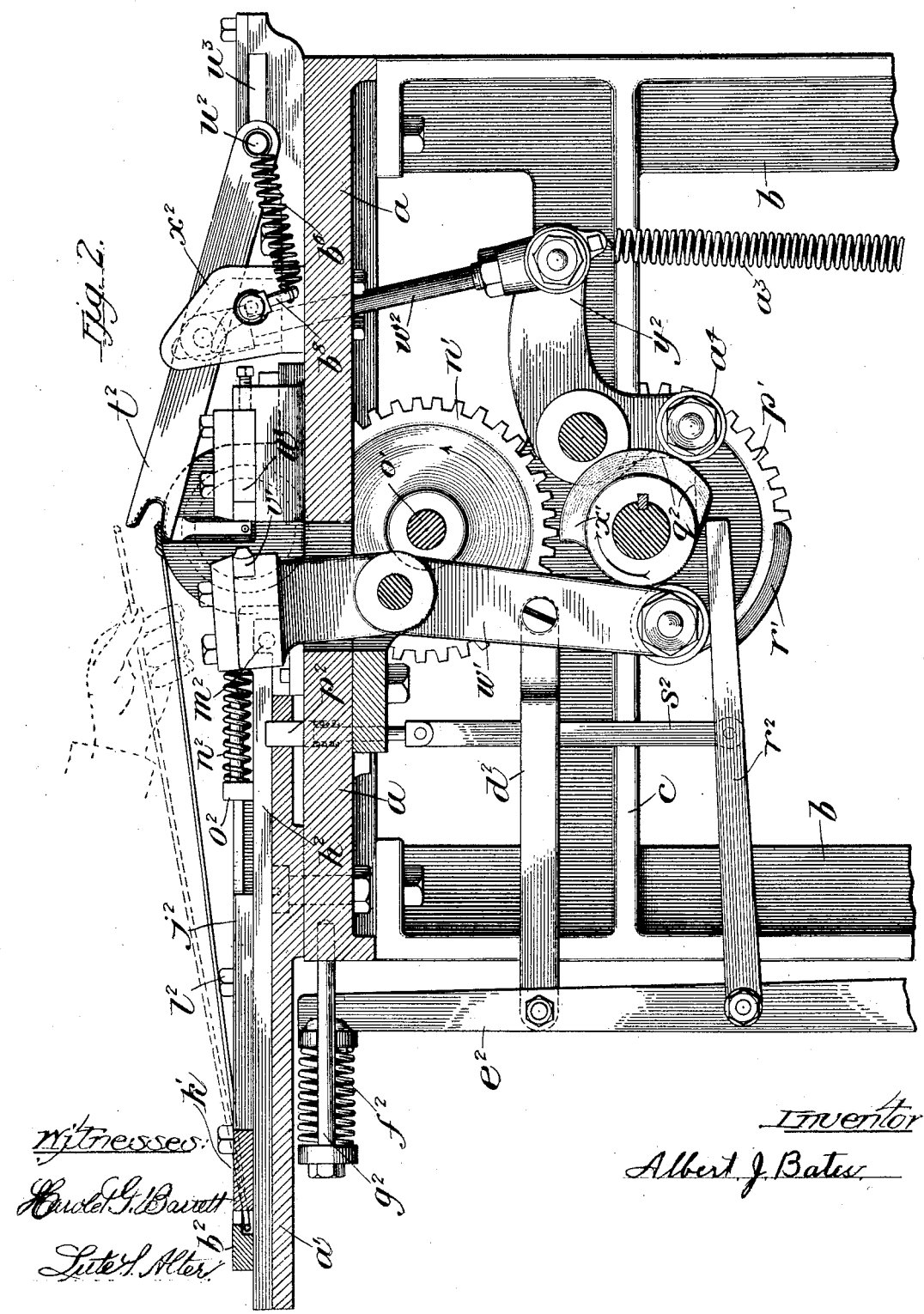

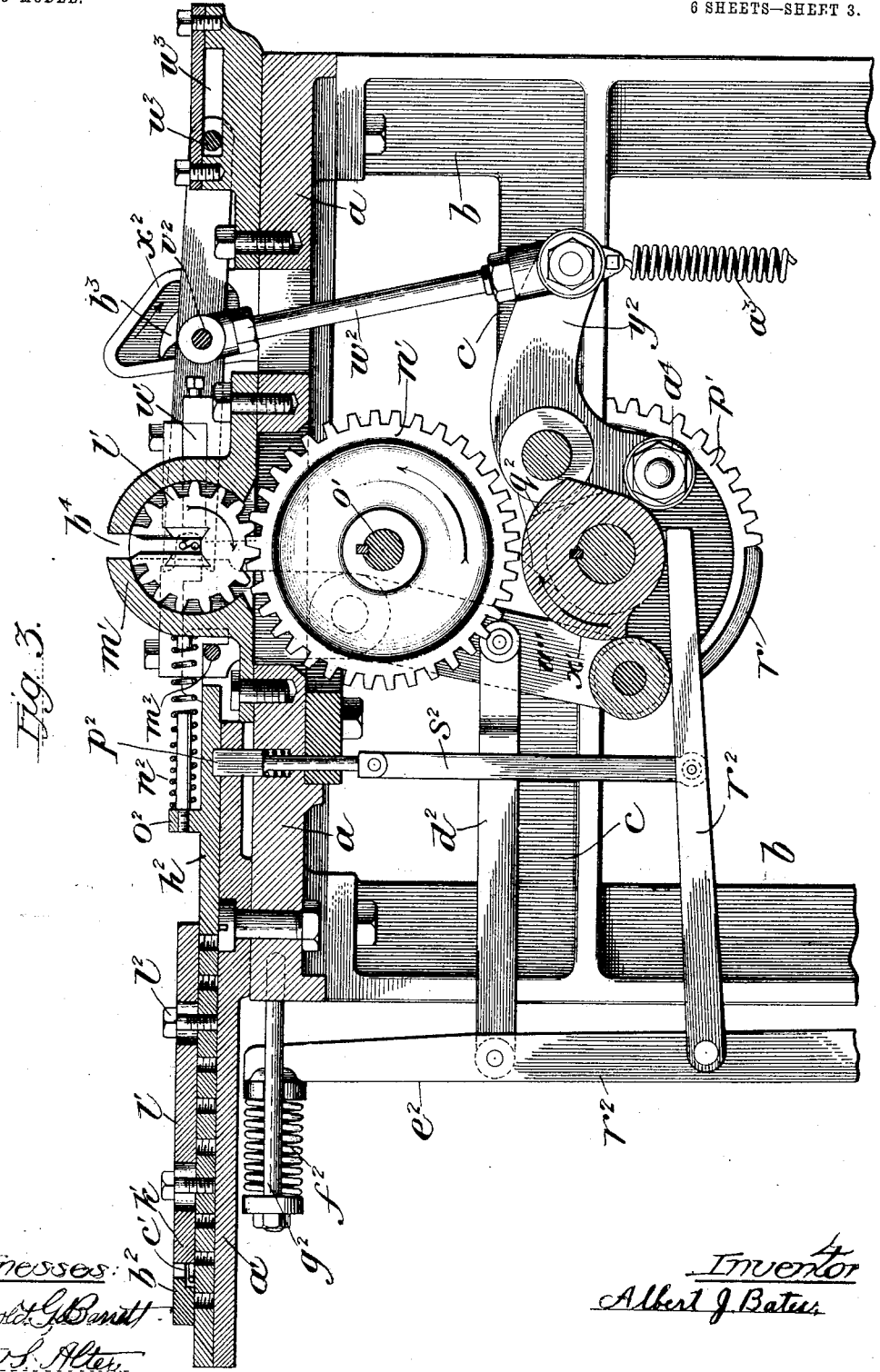

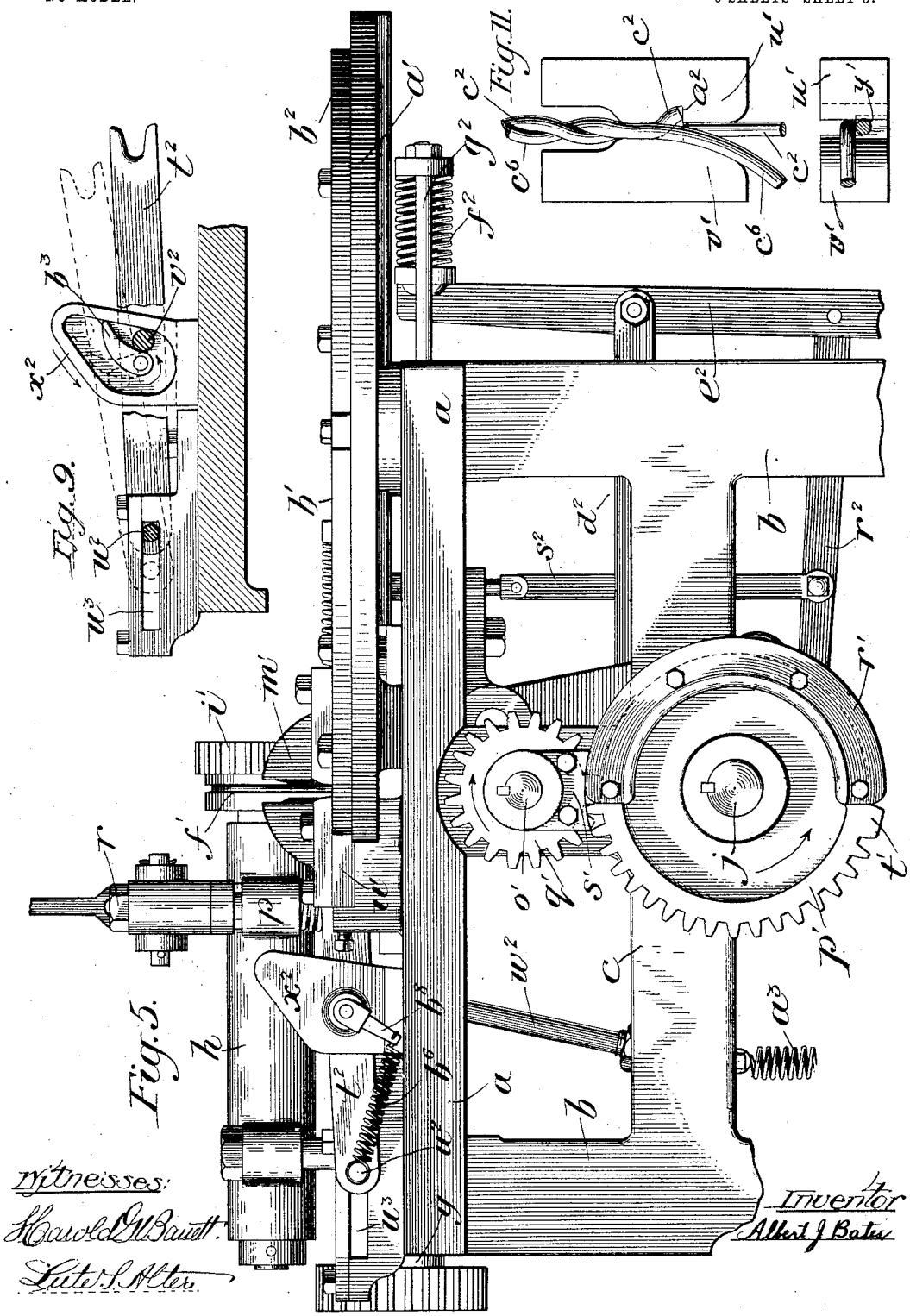

No. 746,442. PATENTED DEC. 8, 1903.
A. J. BATES.
MACHINE FOR MAKING WIRE HOOPS.
APPLICATION FILED OCT. 5, 1903.
NO MODEL. 6 SHEETS—SHEET 6.
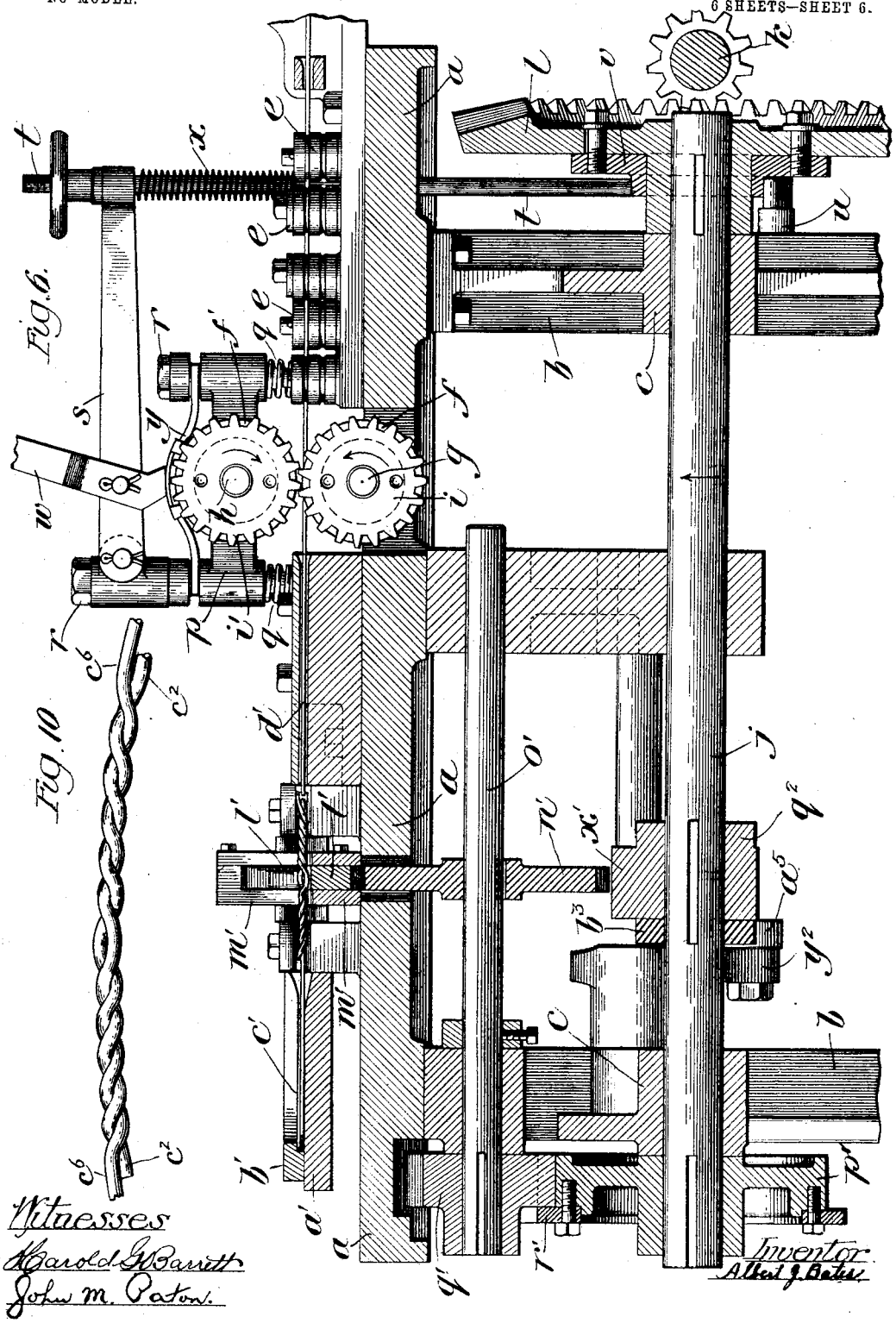

No. 746,442. Patented December 8, 1903.

UNITED STATES PATENT OFFICE.

ALBERT J. BATES, OF JOLIET, ILLINOIS, ASSIGNOR TO THE AMERICAN STEEL & WIRE COMPANY, A CORPORATION OF NEW JERSEY.

MACHINE FOR MAKING WIRE HOOPS.

SPECIFICATION forming part of Letters Patent No. 746,442, dated December 8, 1903.

Application filed October 5, 1903. Serial No. 175,879. (No model.)

*To all whom it may concern:*

Be it known that I, ALBERT J. BATES, a citizen of the United States, residing at Joliet, county of Will, State of Illinois, have invented certain new and useful Improvements in Machines for Making Wire Hoops; and I do hereby declare the following to be a full, clear, and exact description of the invention, such as will enable others skilled in the art to which it appertains to make and use the same.

The invention relates to machines for making wire hoops for barrels, kegs, and the like, and especially to such of these machines where the wire is fed endwise around a circular or annular mandrel or former until the leading end laps over the running part, when the overlapped portions are gripped, the part of the wire forming the hoop is cut from the supply-strand, and the overlapping portions are twisted together between the grippers to complete the hoop.

The invention is illustrated in the accompanying drawings, forming part of this specification, wherein—

Figure 1 is a plan of the entire machine, only a small portion of the bed-plate being omitted. Fig. 2 is a vertical section on the line 2 2 of Fig. 1. Fig. 3 is a vertical section taken parallel with Fig. 2 on the line 3 3 of Fig. 1. Fig. 4 is a side view of the entire machine. Fig. 5 is an enlarged elevation of the machine looking in the direction of the arrow in Fig. 1. Fig. 6 is an enlarged section on the line 6 6 of Fig. 1. Fig. 7 is a detail perspective of the rod by means of which the hoop-clamp is operated. Fig. 8 is a detail elevation of the cam which operates to lift the upper feed-roll. Fig. 9 is a detail section of the hoop-discharger and the cam which controls its movement. Fig. 10 is an enlarged elevation of the twisted portion of a hoop formed by the machine. Fig. 11 is a detail of the gripper-jaws in plan.

Referring to the views, $a$ denotes the bed-plate of the machine, $b\ b$ the vertical standards, and $c\ c$ the horizontal cross-bars of the frame which supports the shafts and gearing that drive the operative parts and on which the bed or table $a$ is erected.

The front end of the machine is provided with series of small straightening-rolls $d\ d$ and $e\ e$, that are free to revolve in the usual way, and the wire is drawn from the supply spool or coil through these rolls by a pair of feed-rolls $f\ f'$, the lower one of which, $f$, is mounted on a shaft $g$, that is continuously driven, and the upper one of which is mounted on a short shaft $h$, that lies above and parallel with shaft $g$ and is driven therefrom through the intermediacy of gears $i\ i'$ on the ends of the shafts nearest the rolls.

The main shaft of the machine is denoted by $j$. It is continuously driven from a cross-shaft $k$ by means of a pinion meshing with a bevel-gear $l$ on one end of the shaft $j$. The shaft $k$ has a large gear-wheel on one end, and the shaft $g$ of the lower feed-roll $f$ is driven from this wheel by an intermediate idler $n$, which is preferably mounted on an arm $o$, that is adjustably secured to one of the frame-standards, so as to permit the feed-rolls to be driven at different speeds by the substitution of idlers of different sizes.

The shaft of the upper feed-roll is mounted at one end in a yoke $p$, that is free to slide on posts $r\ r$, rising vertically from the bed $a$, and the yoke is held normally in an elevated position, so as to keep the feed-rolls apart by means of strong springs $q$, that are coiled around the posts and react between the bed $a$ and the under side of the yoke. The upper ends of the posts are provided with nuts and washers to limit the yoke's upward movement, and to a sleeve on one of the posts is pivoted an arm $s$, that extends toward the front end of the machine, where it has an adjustable connection with a rod $t$, which extends down through the bed $a$ and is connected to a lever $u$, pivoted to one of the standards $b$. The lever is held by a light spring $x$, coiled around the rod $t$ against the under side of a cam $v$, that is adjustably secured to the gear-wheel $l$ on the end of the main shaft $j$, and once in every revolution of the wheel the arm is pulled down, so as to overcome the upward stress of the springs $q\ q$ and automatically cause the upper feed-roll to engage the wire lying on the lower roll. The connection between the lever $s$ and the yoke which carries the shaft of the upper feed-roll is made by means of a hand-lever $w$, that is pivoted to the lever $s$ and bears on top of an arched plate-spring $y$, secured between the posts $r\ r$ above the yoke, so that when the lever $w$ is in the position shown in the drawings the depression of the arm $s$ causes the rolls to grip the wire and feed it into the machine; but when the lever is reversed there is no connection between the yoke and the arm $s$ and the springs $q\ q$ are free to raise the upper roll sufficiently above the lower one to stop the feeding of the wire, but not so far as to separate the pinions $i\ i'$, which always remain in mesh. By this arrangement the automatic feeding of the wire may be discontinued and resumed at the will of the operator.

The hoop-forming mechanism consists generally of an annular mandrel or former, into and around the interior of which the wire passes endwise. It is located at one side of the line of feed, so that the wire will pass into it at a tangent, as best shown in Fig. 1, where $a'$ is a fixed circular plate that is secured to the bed of the machine, and $b'\ b^2$ are semi-annular rings that are secured to the plate and are provided with grooves $c'$ on their inner faces to receive the wire as it comes from a straight guide $d'$, into which it passes from the feed-rolls. The ring $b^2$ is adjustable on the plate $a'$ toward and from the ring $b'$ by means of bolts $e'$ on the under side of the ring sliding in slots $g'$ in the ring $a'$, so that the diameter of the mandrel or former may be increased or diminished to make large or small hoops, and between the ends of the semi-annular rings there are removably secured to the plate $a'$ small blocks $h'$, corresponding in cross-section to the rings, the object of this arrangement being to maintain a practical continuity for the rings by providing for the substitution of other blocks as the space between the ends of the rings is increased or diminished.

Within the circle described by the rings $b'\ b^2$ on the side nearest the line of wire there are two quadrant-shaped filling-blocks $j'\ j'$, whose outer edges fit sufficiently close to the inner face of the ring $b'$ to prevent the wire from being accidentally dislodged from the groove $c'$, but not so as to prevent the wire being lifted therefrom when the hoops are completed. On the other side of the circle described by the rings there is a semicircular clamp $k'$, which is adapted to completely close at intervals the groove in the ring $b^2$ which is farther from the incoming wire and where the liability of accidental and premature escape of the wire is greatest. The means for operating this clamp will be described later on.

As the wire is fed into the mandrel it passes through a twister $l'$ of ordinary construction, that is housed in a casing $m'$, securely fastened down on the bed $a$, so that the circle described by the groove $c'$ in the ring $b'$ passes through the center of the twister, and both the twister and its casing are slotted, as best shown in Fig. 3, to permit the hoop to be lifted out when completed. The twister is rotated intermittently by means of a gear $n'$, which projects upward through a slot in the bed $a$ from a shaft $o'$, that is journaled parallel with and above the main shaft $j$. The teeth of the gear $n'$ mesh directly with similar teeth on the periphery of the twister, as shown in Fig. 3, and the shaft $o'$ is driven intermittently from the main shaft by means of the mutilated gears $p'\ q'$, the former of which is on the main shaft and has a delay-rim $r'$ where the teeth are omitted, and the latter of which has a shoe $s'$, adapted to fit and slide on the rim in a well-known manner. The wheels revolve in the direction of the arrows in Fig. 5, and for the sake of security and certainty of operation the first tooth $t'$ of the segment on the gear $p'$ and the corresponding tooth on the gear $q'$ are made about double the thickness of the other teeth. When a sufficient length of wire has been fed through the twister to form a hoop, with the leading end overlapping the standing part, a gripper which straddles the twister comes into play and seizes the two wires on each side of the twister, the wire forming the hoop being severed at the same time from the main length. The gripper is composed of fixed jaws $u'$, adjustably secured to blocks rising from the bed $a$, one on each side of the twister-casing, and a pair of oppositely-disposed movable jaws $v'$, that are carried by levers $w'\ w'$, that are journaled under the bed $a$ and are operated by cams $x'\ x'$ on the main shaft $j$. The jaws on the far side of the twister may be of any desired shape; but those on the side where the wire enters are formed as shown in detail in Fig. 11, the lower half of the movable jaw being provided with a knife or cutter $y'$, projecting beyond the face of the jaw and adapted to enter a recess $a^2$ in the face of the opposing fixed jaw. As the leading end $b^2$ of the wire completes the circle of the mandrel it passes above the running part $c^2$, so that when the jaws come together the end $b^2$ is simply gripped, while the part $c^2$ is cut, thus severing the hoop from the running part and leaving the two portions securely held by the grippers on each side of the twister. In order to hold the gripper-jaws open and at the same time keep the lower end of the levers $w'$ in working contact with the cam $x'$, the levers are connected by a bar $d^2$ with a spring-pressed lever $e^2$, that is pivoted to a lower cross-bar of the frame and is pressed inwardly at its upper end by a spring $f^2$, which is arranged to react between the outer side of the lever and washers carried by short rods $q^2$, projecting from the bed $a$.

The semicircular hoop-clamp $k'$, before described, is operated from the movable jaws of the gripper by means of a bar $h^2$. (Shown in detail in Fig. 7.) This bar is provided with a forked hook $i^2$ at its front end, which catches over pins on the inner sides of the jaws $v'\ v'$, so that when the jaws are moved the bar will be operated. At its rear end the bar is adjustably connected to an arm $j^2$ of the clamp, the bar being provided along its length with a series of perforations, into any of which may be tapped one or more headed screws $l^2$, that pass through slots in the arm and fasten the two parts together. As shown in Fig. 1, the forked end of the bar straddles the twister-casing and lies between the two jaws $v'\ v'$, so that the pins $m^2\ m^2$ on the inner sides of the jaws will engage the hook and cause the bar to move endwise as the jaws are opened and closed, and it is to be noted that considerable play is provided between the hook and the pins, so that the bar may move independently of the gripper-jaws in one direction and the jaws in closing may move some distance before they operate the bar. The clamp is closed and held normally against the ring $b^2$ by a spring $n^2$, mounted on the front end of the bar $h^2$ and which reacts between a lug $o^2$ thereon and the side of the twister-casing. At this time the gripper-jaws are open; but just before the jaws close the pins $m^2\ m^2$ pull the bar $h^2$ forward and separate the clamp from the ring $b^2$, thereby opening the groove $c'$, and in order to hold the clamp away from the ring until the jaws are again completely opened a lock is provided consisting of a spring-pressed trigger $p^2$, sliding up through the bed $a$ and controlled by the cam $x'$ on the shaft $j$ through the intermediacy of a lever $r^2$, that is pivoted to the lever $e^2$ or to any other part of the machine and has a link-like connection $s^2$ with the trigger. In the revolution of the shaft $j$ the cam $x'$ engages the lever $r^2$. The trigger is therefore withdrawn, and the clamp closes the groove $c'$ before the leading end of the wire reaches the ring $b^2$, and the clearance between the hook $i^2$ and the pins $m^2\ m^2$ is due to the fact that the gripper-jaws move back before it is time for the bar $k^2$ to close the clamp $k'$ against the ring $b^2$.

The discharger for the completed hoops is best shown in Figs. 2, 3, and 9. In consists of a pair of parallel bars $t^2\ t^2$, that are held at such distance apart by a spacing-block as to straddle the twister-casing, as shown in Fig. 1. At its rear end the bars are united by a pin $u^2$, that plays in an elongated slot or keeper $u^3$ and forms a sliding pivot for the discharger. At a point about midway of their length the bars $t^2\ t^2$ are connected to a pin $v^2$, that is carried by the upper end of a rod $w^2$ and projects laterally from each side of the discharger into cam-grooved guides $x^2$, secured to the bed of the machine. The rod $w^2$ is connected at its lower end to one arm of a bell-crank lever $y^2$, that is pivoted to a crossbar and has a roller $a^4$ on its other arm, that is held by a spring $a^3$ in operated relation to a cam $a^5$ on the shaft $j$ alongside the cam $x'$. The rotation of the shaft causes the bell-crank to rock and raise and lower the front end of the discharger, and the cam-grooved guides cause it to move back and forth toward and from the slot $b^4$ in the twister-casing, so as to catch the hoop when the twisters have united the ends and lift the hoop out of the twister, so that it can be grasped by the operator and lifted out of the former, all as indicated in dotted lines in Fig. 2. The guides $x^2\ x^2$ are open on the side toward the bars forming the discharger, and each has a cam-latch $b^3$ pivoted in it and shaped, as best shown in Fig. 9, so as to cause the pin $v^2$ to travel around the interior of the guides, so as to give the discharger its endwise motion in a manner that will be readily understood from the drawings. The latches are held with their points normally against the vertical wall of the guides by springs $b^6$, which are connected at one end to short arms $b^8$, projecting from the axes of the latches, and at their other ends are attached to the rear end of the discharger. In this way the springs hold the latches yieldingly and also serve to pull the discharger forward and insure the pin $v^2$ traveling around the lower part of the guides in the direction of the arrow in Fig. 9. As the rod $w^2$ rises the discharger is lifted, as shown in dotted lines, and as the rod falls the pin $v^2$ travels downward along the upper side of the latches $b^3$, and the discharger is lowered and its end withdrawn into a position ready to be again advanced, so that its forked end $b^9$ will catch the hoop as soon as the twister stops.

The construction being as thus described, the operation of the machine is briefly as follows: Wire being taken in strand from a reel or coil is carried by the feed-rolls through the guide $d'$ into the annular mandrel or former, passing on its way through the slots in the twister and its casing and through the gripper, whose jaws are normally open. The wire is pushed endwise of the feed-rolls around the groove $c'$ on the interior of the semi-annular rings $b'\ b^2$ until the leading end passes above and overlaps the running part, as shown in Fig. 1. While the gripper-jaws are open the clamp $k$ is held against the ring $b^2$, thereby closing the groove in this ring and holding the wire therein. After the leading end of the wire has been lapped over the running part, as just described, the roll $f'$ is lifted out of contact with the roll $f$ and the feeding of the wire ceases. The gripper-jaws $v\ v'$ then immediately close, and the cutter $y'$ severs the wire included in the hoop from the supply part and holds the overlapped portions of the wire on each side of the twister-casing, the leading end $c^6$ passing above the cutter, as shown in Fig. 11. The twister then revolves and forms a reversed twist in the overlapped wires, as shown in Fig. 10, and the twister is stopped with its slot connecting with the slot $b^4$ in the twister-casing. The hoop-discharger, which up to this time has not projected across the line of the wires, is now advanced until its forked end catches the hoop on each side of the twister-casing, when the discharger is lifted into the position shown in Fig. 2, raising the hoop out of the twister and from between the gripper-jaws.

The operator then seizes and removes the completed hoop from the mandrel, the clamp $k'$ being held open by the trigger long enough for the hoop to be removed.

Having thus described my invention, what I claim is—

1. In a wire-hoop machine, the combination of the upper feed-roll, the yoke in which it is mounted, the pivoted arm $s$, the rod $t$ adjustably connected therewith, the lever $u$, the cam $v$ for operating the lever, and the spring $x$ on the rod.

2. In a wire-hoop machine, the cam of the upper feed-roller, the yoke in which it is mounted, the pivoted arm $s$, the wheel $l$ on the main shaft, the cam $v$ adjustably secured to the wheel, and the rod connecting the arm $s$ to a lever $u$ operated by the cam.

3. In a wire-hoop machine, the combination of the twister $l'$, the casing inclosing it, the gripper-jaws on each side of the casing, the annular mandrel having the ring $b^2$, the clamp $k'$ coöperating with the inner surface of the ring, and a connection between the clamp and the movable jaws of the gripper.

4. In a wire-hoop machine, the combination of the twister $l'$, the casing inclosing it, the gripper-jaws on each side of the casing, the levers $w'$, $w'$, carrying the movable jaws of the gripper, the spring-pressed lever $e^2$ to which the levers $w'$, $w'$ are link-connected, and the cam $x'$ for operating the jaw-levers.

5. In a wire-hoop machine, the combination with the semi-annular ring $b^2$ of the mandrel or former, of the clamp $k'$, the spring $n^2$ for holding the clamp normally against the ring, means for automatically withdrawing the clamp, and a releasable trigger or lock for holding the clamp open.

6. In a wire-hoop machine, the combination with the ring $b^2$ of the mandrel, of the clamp $k'$ having the operating-bar $h^2$ with a hooked end, the movable jaws $v'$, $v'$ of the gripper having a pin $m^2$, the spring $n^2$ for closing the clamp.

7. In a wire-hoop machine, the combination with the ring $b^2$ of the mandrel, of the clamp $k'$ having the operating-bar $h^2$, the trigger $p^3$ link-connected to a lever $r^2$, and the cam $q^2$ for operating the lever to release the trigger.

8. In a wire-hoop machine, the combination with the ring $b^2$ of the mandrel, of the clamp $k'$ having the arm $l'$, the operating-bar $h^2$, and screws $l^2$ playing in slots in the arm, and adapted to be connected to the bar at different points to adjust the throw of the clamp.

9. In a wire-hoop machine, the combination of the plate $a$, the semi-annular rings $b'$, $b^2$, the latter adjustable toward and from the former on the plate, and the removable blocks $h'$ interposed between the ends of the rings and interchangeable with blocks of different sizes to fill the space between the rings as they are adjusted.

10. In a wire-hoop machine, the combination of the semi-annular ring $b'$ of the mandrel, the filling-blocks $j'$, $j'$ coöperating therewith, the semi-annular ring $b^2$ adjustable toward and from the ring $b'$, the clamp $k'$ coöperating with the ring $b^2$, the operating-rod $h^2$ for the clamp, and an adjustable connection between the clamp and the rod.

11. In a wire-hoop machine, the combination with the discharger, of the cam-guides $x^2$, $x^2$, the pin on the discharger working therein, the bell-crank $y^2$ having one arm link-connected with the discharger and the other operated by a cam $a^5$, and the spring $a^3$ for holding the bell-crank in operative relation to the cam.

12. In a wire-hoop machine, the combination with the twister $l'$, the shaft $o'$ for operating the twister, the shaft $j$ for driving the shaft $o'$, the mutilated gear $p'$ on the shaft $j$ having the large tooth $t'$ at the front end of the toothed portion, the pinion $q'$ on the shaft $o'$ meshing with the gear $p'$, and a large tooth on the pinion coöperating with the tooth $t'$ of the gear.

In testimony whereof I affix my signature in presence of two witnesses.

ALBERT J. BATES.

Witnesses:
JOHN PATON,
JESSIE C. DICE.